Figure 1:
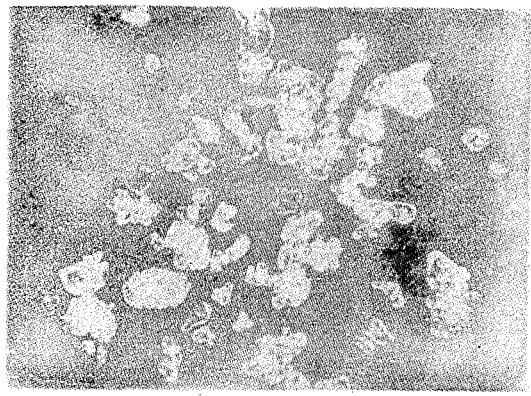
Figure 1:
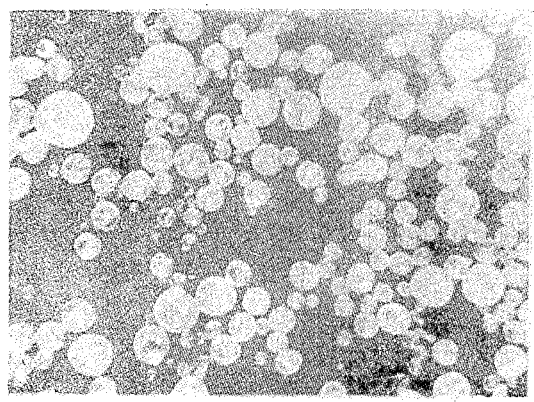

March 31, 1942.   F. S. CHAMBERS ET AL   2,278,059
FREE-FLOWING SODIUM NITRATE PRODUCT AND METHOD OF PREPARATION Filed July 28, 1939

*Francis S. Chambers*
*William E. Kirst*   INVENTORS

BY *Thos. A. Wilson*

ATTORNEY

Patented Mar. 31, 1942

2,278,059

UNITED STATES PATENT OFFICE 2,278,059

FREE-FLOWING SODIUM NITRITE PRODUCT AND METHOD OF PREPARATION

Francis S. Chambers and William E. Kirst, Woodbury, N. J., assignors to E. I. du Pont de Nemours & Company, Wilmington, Del., a corporation of Delaware Application July 28, 1939, Serial No. 286,964

4 Claims. (Cl. 23—104)

This invention relates to an improved form of sodium nitrite, and more particularly to a novel method of preparing such a product in free-flowing form.

Sodium nitrite is a chemical compound of considerable technical importance, having many applications in industry. The most important method of manufacture at the present time consists of absorbing in an alkaline solution the nitrogen oxides resulting from the catalytic oxidation of ammonia. By proper control of conditions, sodium nitrite is obtained substantially free from carbonate and nitrate. The solution of nitrite thus made may be concentrated and crystallized to produce the solid salt.

While the product obtained by the foregoing operation is satisfactory with regard to purity, it is ordinarily of an undesirably high degree of fineness and contains irregular particles, in which condition it flows or pours with difficulty. On storage, moreover, particularly under the influence of moisture, the usual crystallized product tends to become caked or set, so that a solid block of material results which can be broken up only by violent impact.

The object of the present invention is a sodium nitrite having outstanding free-flowing properties. A further object is such a product which possesses a greatly reduced tendency to form a caked mass on storage. A further object is a novel method of producing the material described. A still further object is a method of producing a free-flowing product of controlled particle size. Additional objects will be set forth as the invention is disclosed in greater detail hereinafter.

We have found that the foregoing objects are accomplished and that a free-flowing product is obtained when sodium nitrite in molten form and at a temperature not sufficiently high to cause decomposition is made to pass through a suitable device which converts it to fluid particles of the desired size. The distinct particles of material are then cooled and solidified before coming in contact with deforming or contaminating influences.

Various methods may be adopted for carrying out our invention. We may, for example, cause molten sodium nitrite to flow by gravity or under pressure through a suitable spray nozzle or the holes in a metal plate and then fall through the air or other gaseous medium far enough to assure solidification. By such methods the particle size is determined by the diameter of the holes in the plate or by varying the pressure. Preferably, however, we cause the molten sodium nitrite to pass through distributing openings in a revolving disc where the size of particles of the solidified material will be controlled by the disc velocity.

In operating according to our invention, the temperature of the molten material at the time of spraying will be far enough above the melting point of sodium nitrite to assure sufficient fluidity to allow the drops to take the desired globular form. Preferably, when substantially pure sodium nitrite is sprayed, we maintain the molten material at a temperature between 285° and 340°, and normally below 315°. We find 300° C. a very satisfactory spraying temperature. Whatever the form of device used for carrying out the invention, the solidified particles will have a substantially spherical shape. While our invention is directed to the production of a globular sodium nitrite, it should be understood that other materials may be blended with the sodium nitrite prior to spraying for purposes of fusion point depression or varying the composition of the final product. Sodium nitrate and sodium chloride are examples of such additional materials.

The following examples will illustrate specific embodiments of our invention applied to the spraying of molten sodium nitrate, and the formation of spherical particles of solidified material therefrom. In the tabulation below, A represents a product obtained by forcing the material under pressure through perforations in a metal plate, B and C materials sprayed by means of a pressure nozzle, and D-G materials sprayed through openings in a revolving disc.

| | Method | | | | | | |
|---|---|---|---|---|---|---|---|
| | Pressure | Spray nozzle | | Revolving disc | | | |
| | A | B | C | D | E | F | G |
| Size openings inches | 0.020 | | | | | | |
| Pressure lbs./sq. in. | 4.5 | 11 | 21 | | | | |
| Disc diameter inches | | | | 4 | 4 | 4 | 4 |
| R. P. M. | | | | 2,000 | 2,900 | 4,000 | 5,500 |
| Fineness modulus | 3.84 | 2.56 | 1.88 | 2.03 | 1.67 | 1.35 | 0.92 |
| *Screen analysis* | | | | | | | |
| Held on— | | | | | | | |
| 8 mesh | 0.0 | 0.0 | 0.0 | 0.0 | 0.0 | 0.0 | 0.0 |
| 10 mesh | 18.1 | 0.0 | 0.0 | 0.0 | 0.0 | 0.0 | 0.0 |
| 14 mesh | 66.1 | 0.9 | 0.0 | 0.0 | 0.0 | 0.0 | 0.0 |
| 20 mesh | 15.4 | 16.1 | 0.9 | 0.5 | 0.4 | 0.2 | 0.0 |
| 28 mesh | 0.3 | 41.4 | 11.1 | 10.4 | 1.5 | 0.3 | 0.0 |
| 35 mesh | 0.1 | 30.5 | 35.2 | 63.4 | 15.1 | 7.6 | 0.4 |
| 48 mesh | 0.0 | 9.2 | 31.8 | 18.5 | 50.5 | 34.2 | 10.8 |
| 65 mesh | 0.0 | 0.1 | 11.0 | 5.4 | 19.4 | 27.5 | 24.6 |
| 100 mesh | 0.0 | 0.6 | 7.3 | 1.6 | 10.4 | 22.5 | 45.1 |
| Passing 100 | 0.0 | 1.2 | 2.7 | 0.2 | 2.7 | 7.3 | 19.1 |

In the foregoing tabulation, designation has been made of the fineness modulus of the various products obtained. This modulus is a convenient way of expressing a weighted average of fineness in which the respective percentages of material held on the following standard screens are totaled and the product divided by 100. The screens used comprise those of 8, 14, 28, 48, and 100 mesh. In other words, the greater the fineness modulus, the coarser the product. As a comparison of our product with that of the prior art, we show below the degree of fineness of two of the better grades of material available, of which A was obtained by an ordinary crystallization process, while B was the product of a vacuum crystallizer:

| Screen analysis | A | B |
|---|---|---|
| On— | | |
| 8 mesh | 0.0 | 0.0 |
| 10 mesh | 0.1 | 0.0 |
| 14 mesh | 0.2 | 0.0 |
| 20 mesh | 0.3 | 0.1 |
| 28 mesh | 1.0 | 2.1 |
| 35 mesh | 2.7 | 14.2 |
| 48 mesh | 13.1 | 35.0 |
| 65 mesh | 34.2 | 24.8 |
| 100 mesh | 27.9 | 17.4 |
| Passing 100 | 20.5 | 6.4 |
| Fineness modulus | 0.99 | 1.47 |

By way of illustration of our product in comparison with that of the prior art, Figure 1 of the accompanying drawing shows a photomicrograph of crystalline sodium nitrite produced by methods of the prior art. Figure 2 illustrates the spherical, free-flowing product obtained by our invention.

It has been brought out in the foregoing that a major point of superiority of our sprayed product lies in its free-running properties. Not only does it pour readily at the time of preparation, but it retains this property on storage for long periods of time. The initial superiority in this respect will be apparent, since the material according to our invention comprises substantially spherical pellets of the desired size, whereas the crystalline product of the prior art has consisted of irregularly-shaped conglomerates of difficultly-flowable material. The great advantage will come, however, not so much in initial superiority as in a retention of the free-flowing ability. Whereas the crystalline product tends to cake on storage and to become a solid mass of material impossible to pour or even to break up without the use of considerable force, our product remains in the form of the original spherical particles. Because of this spherical form, there is a minimum of surface contact between the individual pellets, in contrast to the extensive contact in the case of the crystalline product of the prior art. Consequently, our material has substantially no tendency to cake. This is a particularly desirable point in the case of sodium nitrite which possesses a considerable affinity for water, a major cause of lumping and caking in finely-divided water-soluble materials. While we are not limited as to size of particles, preferably our material has a fineness modulus between 0.9 and 4.0.

We have stated in the foregoing that a preferred method of preparing our product is by the use of a revolving spray disc. With such a device, the fineness of the product is readily controlled by regulation of the velocity of rotation of the disc, or, more exactly, by control of the peripheral speed. While discs of various diameters may be employed, we find a suitable one to have a diameter of 4". Using such a disc, an excellent product is obtained, comprising spherical pellets of the degree of fineness desired. With a given disc diameter, the higher the velocity of the disc, the smaller the diameter of the pellets, as will be seen from Examples D to G.

We have described our invention at length in the foregoing. It will be understood, however, that many variations may be introduced in the details of operation and in methods of control without departing from the scope of the invention. We intend to be limited therefore only by the following claims.

We claim:

1. The method of producing a free-flowing sodium nitrite, which comprises maintaining sodium nitrite at a temperature sufficiently elevated to assure molten state but not sufficiently high to cause decomposition, causing said material in molten form to pass through orifices of predetermined size to form comminuted particles, and effecting cooling and solidification of the comminuted particles while distinct entities.

2. The method of claim 1, in which the sodium nitrite at the time of its subdivision into comminuted particles is at a temperature between 285° and 340° C.

3. The method of producing a free-flowing sodium nitrite product which comprises causing sodium nitrite in molten form to pass through orifices of a spraying device while at a temperature between 285° and 315° C., causing the comminuted particles to pass through a gaseous cooling medium, and thereby effecting solidification.

4. The method of producing substantially spherical particles of sodium nitrite of a predetermined degree of fineness, which comprises spraying, by means of a revolving disc, sodium nitrite in molten form and at a temperature between 285° and 315° C., determining the diameter of the final particles by control of the velocity of rotation of said revolving disc, causing the comminuted particles to pass through a gaseous cooling medium and thereby bringing about solidification.

FRANCIS S. CHAMBERS.
WILLIAM E. KIRST.